United States Patent [19]

Bloks et al.

[11] Patent Number: 5,689,507
[45] Date of Patent: Nov. 18, 1997

[54] SIGNAL PROCESSING SYSTEM

[75] Inventors: Rudolf H.J. Bloks; Marnix C. Vlot, both of Eindhoven, Netherlands

[73] Assignee: U.S. Philips Corporation, New York, N.Y.

[21] Appl. No.: 498,291

[22] Filed: Jun. 30, 1995

[30] Foreign Application Priority Data

Jul. 5, 1994 [EP] European Pat. Off. .............. 94201945

[51] Int. Cl.$^6$ ................................................ H04L 12/56
[52] U.S. Cl. .......................................... 370/389; 370/503
[58] Field of Search ........................... 370/94.1, 94.2,
370/94.3, 60, 60.1, 61, 100.1, 110.1, 105.1,
85.1, 79, 95.1, 95.2, 95.3, 65.7, 85.13,
362, 363, 364, 376, 377, 378, 379, 389,
392, 395, 397, 407, 408, 421, 428, 310,
321, 322, 324, 468, 503, 902, 905, 412–419,
465, 445, 451; 348/5, 2, 15, 8, 10; 375/354,
355, 356, 359, 365; 340/825.02, 825.03;
455/5.1; 379/204, 95, 96

[56] References Cited

U.S. PATENT DOCUMENTS

5,166,927  11/1992  Iida et al. ................................. 370/60
5,485,507  1/1996   Brown et al. ............................. 379/91

*Primary Examiner*—Dang Ton
*Attorney, Agent, or Firm*—Michael E. Marion

[57] ABSTRACT

A signal processing system comprising a source apparatus coupled to a destination apparatus, the source apparatus being arranged for supplying the destination apparatus with a signal comprising video data, a time-stamp and synchronization data representing a time-value of an instant of said supplying, the destination apparatus being arranged for receiving the signal, synchronizing a time-value of a clock in accordance with the synchronization data, detecting when the time-value of the clock corresponds to the time-stamp and for thereupon presenting the video data at an output. The system includes a bus operable according to a time-slot allocation protocol, the source apparatus supplying the signal to the destination apparatus via the bus, the source apparatus including a first interface unit for buffering the signal until an allocated time-slot is available on the bus, the source apparatus setting the synchronization data according to an instant the signal is supplied to the first interface unit. The destination apparatus including a buffer, for buffering the signal prior to synchronizing the time-value of the clock for a predetermined interval, at least equal to a maximum wait-interval for the allocation of a time-slot on the bus, has elapsed after the instant the signal is supplied to the first interface unit.

12 Claims, 5 Drawing Sheets

SIGNAL PROCESSING SYSTEM

BACKGROUND OF THE INVENTION

The invention relates to a signal processing system comprising a source apparatus coupled to a destination apparatus, the source apparatus being arranged for supplying a signal to the destination apparatus, the signal comprising video data and a time-stamp, the destination apparatus comprising a clock and means for detecting when a time-value of the clock corresponds to the time-stamp and for thereupon presenting the video data at an output, the signal further comprising synchronization data representing a time-value associated with an instant of delivery of the signal in the destination apparatus, the destination apparatus being arranged for adjusting the time-value of the clock according to the synchronization data. The invention also relates to a source apparatus and a destination apparatus for such a system.

A system according to the preamble is known from the ISO/IEC 11172-1 standard, "Information technology— coding of moving pictures and associated audio for digital storage media at up to about 1.5 Mbit/s, Part 1: Systems", first edition 1993-08-01, which will be referred to as the MPEG standard. The systems described by it will be referred to as MPEG systems; these contain for example an MPEG encoder as source apparatus and an MPEG decoder as destination apparatus.

An MPEG system imparts delay variations to the transport of the video data between the input and the output. To eliminate the effect of these variations, the system provides for a time stamping mechanism. In the source apparatus (encoder), the clock time-value at which the video data must be presented at the output (and the time-value at which decoding must start in the case of MPEG) is coded in time-stamps. For proper operation this requires that both the source apparatus and the destination apparatus know the clock time-value.

However, the clock is located in only one apparatus. Therefore a mechanism is provided to allow the source apparatus to set the clock in the destination apparatus each time synchronization data is supplied to the destination apparatus (in the MPEG system this data is called the SCR signal). The synchronization data represents the time value that, according to the source apparatus, the clock in the destination apparatus should have attained by regular progression at the time of supplying the signal.

To supply MPEG encoded signals in a system with more than two apparatuses, it is desirable to supply the MPEG encoded signals over a bus to which a plurality of apparatuses can have access. Such a bus requires an access protocol, which allows different apparatuses to have access in different time-slots. Therefore, in a system with a bus it is necessary to wait with supplying the signal until the time-slot is allocated. Thus, the instant of supplying the signal is dependent on the allocated time-slot.

Since the synchronization data corresponds to the instant the signal is supplied, this would require that the synchronization data depends on the allocated time-slot. To realize this, an MPEG encoder would have to wait with generating an SCR signal until it was allowed to supply this signal. Other source apparatuses, such as video recorders, which merely pass preformed MPEG signals, would have to modify the time value of the SCR signal in the MPEG signal in order to account for the time it is given access to transmit this signal over the bus. This means that the bus interface must be adapted in dependence on the apparatus in order to adapt the MPEG signal to the bus.

SUMMARY OF THE INVENTION

Amongst others, it is an object of the invention to provide for a digital signal processing system according to the preamble which uses a bus in which selected time-slots are allocated for supplying the signal from the source apparatus to the destination apparatus, in such a way that no bus-dependent intervention in the signal generated by the source apparatus is needed.

The system according to the invention is characterized, in that it comprises a bus operable according to a time-slot allocation protocol, the source apparatus comprising a first interface unit for buffering the signal until an allocated time-slot is available on the bus, the synchronization data being set according to an instant of delivery of the signal to the first interface unit, the source apparatus supplying the signal to the destination apparatus via the bus, the destination apparatus comprising a buffer for buffering the signal prior to adjusting the time-value of the clock, the buffering in the buffer lasting until a predetermined interval, at least equal to a maximum wait-interval for the allocation of a time-slot on the bus, has elapsed after the instant of delivery of the signal to the first interface unit. In this way, the source apparatus ensures locally that the signal has proper timing. The signal is then delivered in the destination apparatus via the bus after a predetermined rime interval. In this way, the relative timing of different signals delivered in the destination apparatus is the same as in the source apparatus.

An embodiment of the system according to the invention is characterized, in that the source apparatus and the destination apparatus comprise a first further clock and a second further clock respectively, means for synchronizing the first and second further clock to each other by further signals via the bus, the source apparatus being arranged for obtaining a sample value from the first further clock at the instant of delivery to the first interface unit, and transmitting information about that sample value to the destination apparatus, the buffer buffering the signal until the second further clock exceeds the sample value by a predetermined offset representing the predetermined interval. This provides a simple way of realizing the predetermined delay.

An embodiment of the system according to the invention is characterized, in that the signal comprises packets, mutually separated by pauses, the sample value being obtained upon delivery of a first part of a packet to the first interface unit, the source apparatus being arranged for obtaining a further sample value from the first further clock upon delivery of a second part of said packet to the first interface unit, the buffer regulating a speed at which the signal is output such that the number clock cycles between outputting the first and the second part of the packet is substantially equal to the difference between the sample value and the further sample value. Preferably, the first and second part are the start and the end of the packet respectively. This makes it possible to ensure, using a single packet, that the synchronization data is properly timed even if it is not at the start or end of the packet, without having to interpret the content of the packet, and even if the length of the pause between packets may vary. The term packet as used herein covers both MPEG packs and packets.

A further embodiment of the system according to the invention is characterized, in that the first part precedes the second part in the packet, the first interface unit being arranged for transmitting information about at least a most significant part of the sample value as a difference relative to the further sample value. In this way a minimum amount of information is needed to transmit information about the samples for a given range of sample values.

A further embodiment of the system according to the invention is characterized, in that the first interface unit is arranged for transmitting a least significant part of the sample value. In this way only the most significant part of the sample needs to be reconstructed in the destination apparatus by addition with the further sample.

A further embodiment of the system according to the invention is characterized, in that said least significant pan of the sample value represents a phase in a period a pattern of periodically allocated time-slots on the bus. Preferably, the predetermined interval is an integer number of periods. In this case, the least significant part can be used directly to ensure the correct delay.

Another embodiment of the system according to the invention is characterized, in that the source apparatus is arranged for reproducing the signal from a record carrier, on which it is stored together with further a further time-stamp for regenerating the timing of the signal for supplying it to the destination apparatus, the timing of the signal being regenerated according to the time-stamp prior to supplying it to the first interface unit. In this way use of the time-stamp stored on the record carrier restricted to the source apparatus.

BRIEF DESCRIPTION OF THE DRAWINGS

Further advantageous aspects of the system according to the invention will be discussed using Figures, in which.

DETAILED DESCRIPTION OF THE PREFERRED EMBODIMENTS OF THE INVENTION

Figure 1:
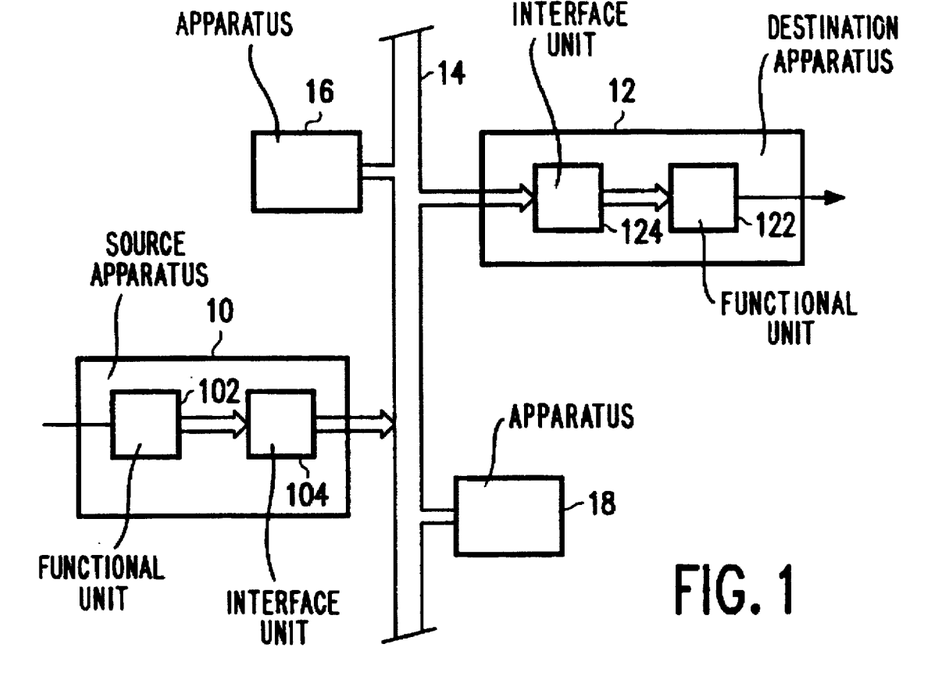
FIG. 1 shows part of a signal processing system containing a number of apparatuses.

FIG. 1 shows part of a signal processing system containing a number of apparatuses 10, 12, 16, 18, connected via a bus 14. The bus 14 is shown sliced off to indicate that it may extend to further apparatuses (not shown) in the system. A first one of the apparatuses 10 is shown as a source apparatus, a second one of the apparatuses 12 is shown as a destination apparatus. The source apparatus 10 contains a functional unit 102, and an interface unit 104. The destination apparatus 12 contains an interface unit 124 and a functional unit 122. The system is suitable for passing video signal information amongst others via the bus 14, examples of the apparatuses being a broadcast receiver, a video recorder, a display system etc. In case of the video recorder, which may serve both as source apparatus and as destination apparatus, the readout mechanism, the channel encoding/decoding mechanism etc. are located in the functional unit 102, 122.

In operation the bus 14 is operated with a protocol that allows communication between pairs of apparatuses (e.g. 10, 12) that are selected from the more than two apparatuses 10, 12, 16, 18 that are connected to the bus 14, or between one source (e.g. 10) and multiple receivers (e.g. 12, 16, 18). An example of a bus 14 with such a protocol is the P1394 bus defined by Apple ("High Performance Serial Bus P1394", draft 6.7 version 1 issued Feb. 18, 1994 by the IEEE standards department). According to this protocol, when a source apparatus 10 has to transmit video information, it requests a time-slot on the bus 14. According to the bus protocol a particular time slot, from a periodically repeating set of time slots is then allocated to the source apparatus 10.

Figure 2:
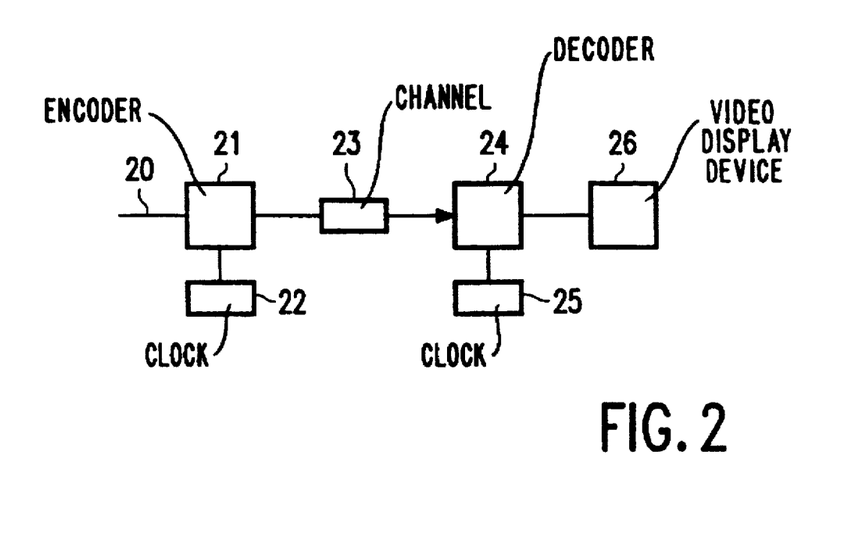
FIG. 2 shows the connection configuration between apparatuses used to define the MPEG standard.

Video information can be encoded and decoded according to the MPEG standard. FIG. 2 shows the connection configuration between apparatuses used to define the MPEG standard. The connection configuration has an input 20, for supplying unencoded video information to an encoder 21. The encoder 21 is coupled to a decoder 24 via a channel 23. The decoder 24 is coupled to a display device 26. The encoder 21 and decoder 24 are coupled to respective clocks 22, 25. The encoder 21 and decoder 24 can be used as source apparatus 10 and destination apparatus 12 in a system as shown in FIG. 1, the bus 14 of FIG. 1 serving as channel 23 of FIG. 2.

In the MPEG encoding process, the presentation units of the signal arriving at the input 20 are associated with time-stamps. Each time-stamp is a sample of the time value of the clock 22 coupled to the encoder 21. This clock runs at a frequency of 90 kHz. The sampling instant is determined by the time of arrival at the encoder 21 of the presentation unit with which the stamp is associated.

In the MPEG decoding process, the time stamps are used to ensure the proper relative timing of the instants at which the presentation units are presented at the output of the decoder 24 for display on the video display device 26. This is to ensure that the video signal is presented at the proper speed, that video and audio remain synchronized, and that the decoder 24 can properly manage its buffers. In order to do this properly, the clock 25 coupled to the decoder 24 needs to be synchronized to the clock 22 of the encoder 21. To achieve synchronization, the encoder 21 sends system clock references (SCRs) to the decoder 24. These references contain the time value of the clock 22 of the encoder 21 at the time of sending, for example when the SCR value is put on the bus 14 in the time-slot that is allocated to the encoder 21 as source apparatus 10. This allows the decoder 24 to set the time value of its clock 25 to the time value contained in the SCR at the time of arrival of the SCR, thus synchronizing its clock to the clock of the encoder 21.

The situation becomes more complicated when a video recorder is used as a source apparatus 10, or if any other apparatus that merely passes the MPEG signal, but does not create it, is used as source apparatus 10. Such an apparatus will need to buffer an incoming MPEG signal until the beginning of the time-slot in which it can be transmitted to the destination apparatus. This means that the time value of the SCR signal will in general no longer correspond to the time of transmitting the SCR signal. If the destination apparatus 12 of FIG. 1 is a decoder 24 as described in FIG. 2 this would mean that the SCR signal can no longer be used to synchronize the clock 25.

Figure 3:
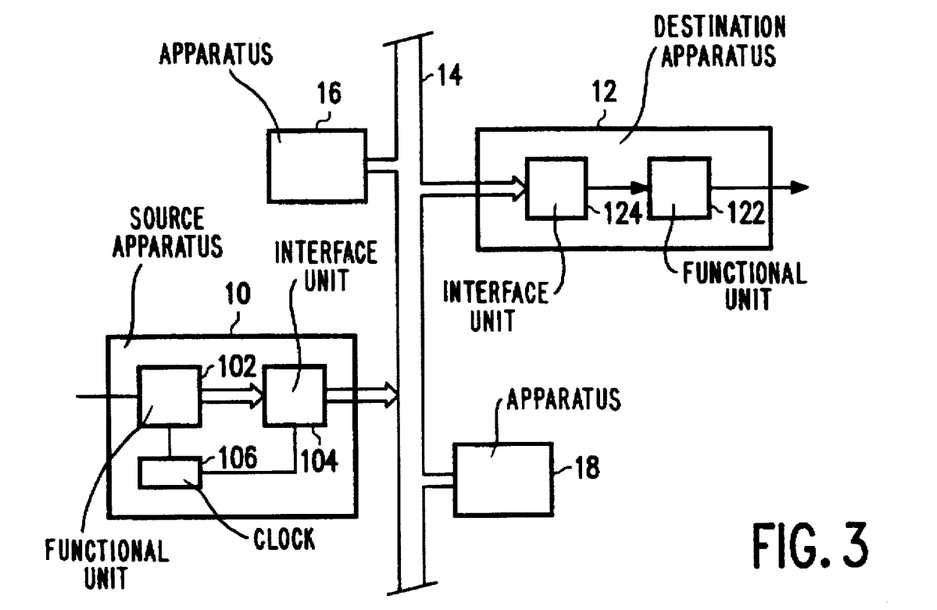
FIG. 3 shows a signal processing system according to the invention.

FIG. 3 shows a system for correcting this. The Figure is similar to FIG. 1 and uses identical reference numerals. In addition to the features of FIG. 1, a clock 106 has been included in the source apparatus 10, which is an apparatus for passing a received MPEG signal. In the system according to FIG. 3, the timing error is corrected by replacing the SCR time values by time values that correspond to the time of the transmission of the SCR signal. To achieve this, an additional clock 106 is included in the source apparatus 10. The additional clock 106 is synchronized to the MPEG signal, as described hereinabove for the clock 25 of the decoder. The additional clock 106 is sampled at an instant corresponding to the instant at which the SCR signal is transmitted in the time-slot which is allocated for transmission according to the bus 14 protocol. The sampled value is used to replace the SCR value in the MPEG signal that is passed by the source apparatus 10.

A video recorder/reproduction apparatus, which retrieves the MPEG signal from a record carrier, may be used as source apparatus 10. In principle, the MPEG signal might be recorded on the record carrier after some elementary channel encoding particular to the recording medium. If the speed of the record carrier is the same on recording and reproduction this would result in a properly timed MPEG signal. However, it has been found that if reproduction were done this way, the SCR timing of the SCR signal as it is recovered from the record carrier is no longer correct, for example due to effects such as tape stretching.

From a copending application to the same assignee (inventor van Gestel, assignees' reference PHN 14.818, in particular page 22 line 23 and following), which is incorporated herein by reference, a mechanism is known to correct for this. For this mechanism, the video recorder comprises a further clock. In the recording mode, the further clock is used to associate further time stamps with the MPEG signal received in the video recorder, for example from an encoder 21. These further time stamps are recorded on the record carrier together with the MPEG signal, such that it is possible to identify the points in the MPEG signal that correspond to the further time stamps.

When the video recorder is used to reproduce the MPEG signal, the further clock is also used. The time value of the further clock is compared to the further time stamps that have been recorded on the record carrier and the result of the comparison controls the reproduction speed of the MPEG signal, such that the relative timing of the originally recorded MPEG signal is reproduced with reference to the additional clock.

The reproduced signal can subsequently be transmitted over the bus 14, as described hereinabove with reference to FIG. 3, correcting the SCR time values according to the time-slot in which the source apparatus 10 is given access to the bus 14.

However, when the source apparatus 10 merely passes the MPEG signal, as is the case for a video recorder, it is disadvantageous that for this correction the source apparatus has to interpret the MPEG signal in order to locate the SCR signals.

Figure 4:
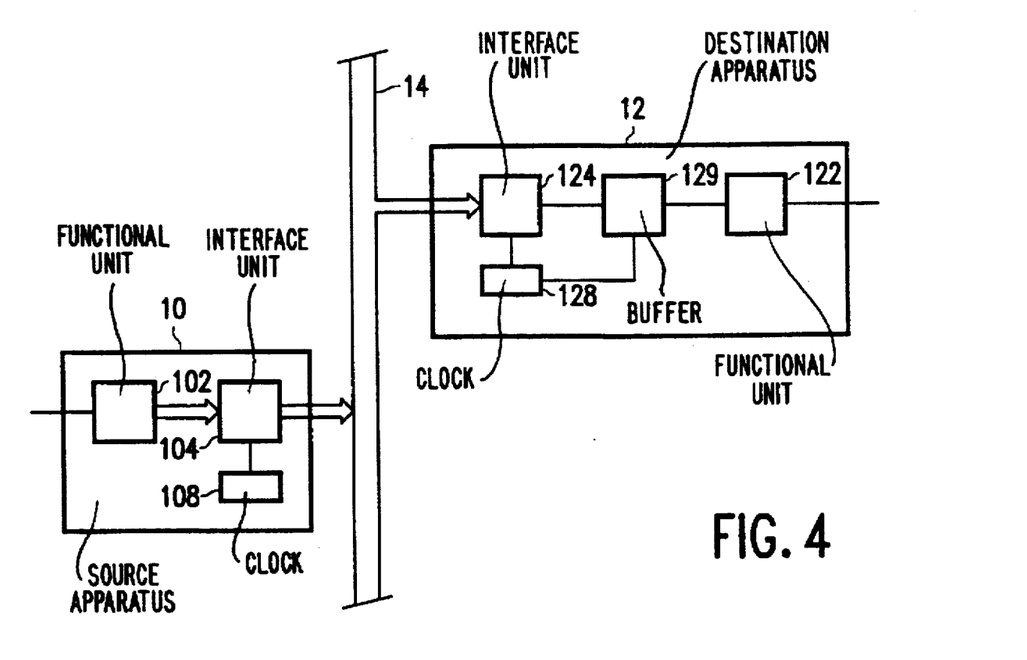
FIG. 4 shows a further improved signal processing system according to the invention.

FIG. 4 shows an improved system for correcting this. The Figure is similar to FIG. 1 and uses identical reference numerals. In addition to the features of FIG. 1, the system contains a clock 108 coupled to the interface units 104 of the source apparatus 10. The system furthermore contains and a buffer 129 coupled between the interface unit 124 and the functional unit 122 of the destination apparatus 12 and a clock 128 coupled to the interface unit 124 and the buffer 129 in the destination apparatus.

In operation, the clocks 108, 128 in the source apparatus 10 and destination apparatus 12 are synchronized to each other, for example in response to signals which are periodically created on the bus 14 by a time-master apparatus, which may be any of the apparatuses 10, 12, 16, 18 connected to the bus 14. These clocks run for example at a frequency of about 25 Mhz, that is, much faster than the clock in the MPEG decoder, thus minimizing inaccuracies due to jitter.

Figure 4A:
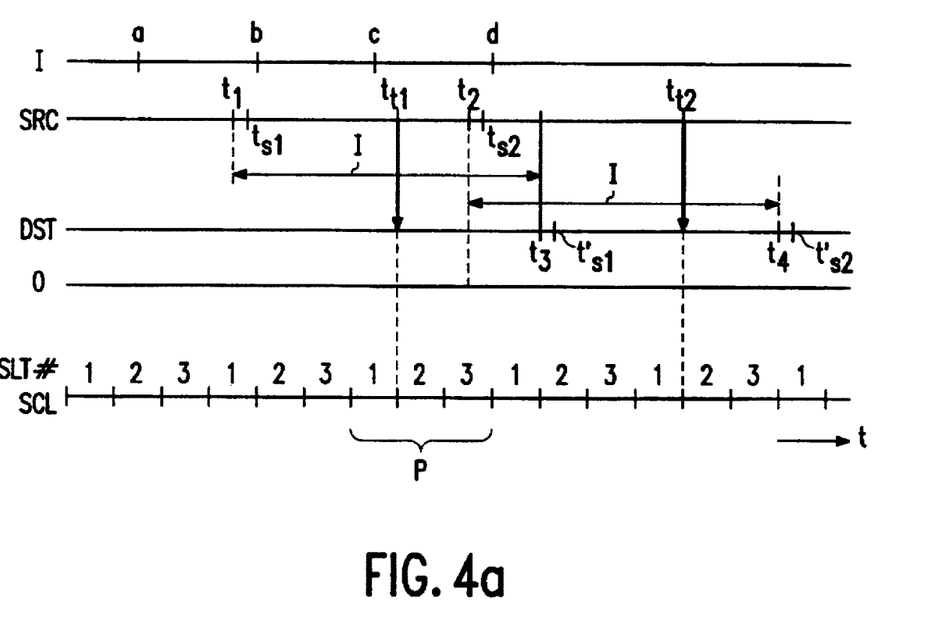
FIG. 4a is a timing diagram for the signal processing system of FIG. 4.

The timing of the various signals is shown in FIG. 4a, which contains a time scale SCL on which successive slots have been indicated, each with a slot number SLT#. The slot numbers repeat periodically. Above this time scale, four lines I, SRC, DST, O are used to indicate the instants of events in the signal encoded by the MPEG signal 10 (I), in the interface unit 104 (SRC), in the interface unit 124 (DST), and at the output of the destination apparatus 12 (O) respectively.

The signal which is encoded by the MPEG signal contains events at instants a,b,c,d which have to be recreated with their original relative timing at the output of the destination apparatus 12.

The functional unit 102 in the source apparatus is arranged to supply an MPEG signal to the interface unit, such that the SCR signals appear at their correct instants (e.g. $t_e$ on the line marked SRC). Upon reception of the MPEG signal, at an instant $t_1$, the first interface unit 104 spies its clock 108. Subsequently, in the time-slot allocated to it according to the bus protocol the interface unit 104 transmits the MPEG signal in combination with the sampled value of the clock 108. The MPEG signal is received by the second interface unit 124. This interface unit 124 place the signal in the buffer 129 until the clock 128 of the destination apparatus 12 exceeds the sampled value of the clock 108 transmitted with the MPEG signal by a predetermined delay value, upon which the MPEG signal is passed from the buffer 129 to the destination apparatus 12. In this way the timing of the signal produced by the functional unit 102 of the source apparatus 10 is reproduced with the delay value, which is chosen at least as large as the maximum delay that can be caused by waiting for the time-slot allocated to the source apparatus 10 according to the protocol used for the bus 14.

The best way to ensure correct timing of the instant at which the SCR signal is delivered to the functional unit 122 in the destination apparatus 12 is to sample the time value of the clock 108 at the instant that the SCR signal is presented to the interface unit 104 of the source apparatus 10, and to supply this signal to the functional unit 122 according to the obtained sample. However, this requires interpretation of the signal, in order to locate the SCR signal.

A preferred alternative is to sample the clock 108 in the source apparatus 10 both at the instant at which the interface unit begins receiving an MPEG signal packet, and at the instant that reception ends. Thus, the duration of the packet is measured in terms of periods of the clock 108 in the source apparatus 10. Information describing the start of the packet and its duration is transmitted via the bus 14 to the destination apparatus 12.

In the destination apparatus 12, the speed with which the packet is supplied to the functional unit is adapted, in order to make its duration in tens of the time values of the clock 128 in the destination apparatus 12 equal to that transmitted with the packet from the source apparatus 10. This can be realized for example by supplying each byte of information from the packet only if the time value of the clock 128 exceeds the time value at the start of transmission by a fraction of the received duration value, the fraction corresponding to the relative position of the byte in the packet. In this way, even though no interpretation of the packet occurs, all signals inside the packet, such as the SCR signal will remain properly timed.

The transmission of the information describing the samples of the clock 108 at the start and the end of the packet preferably does not contain the full sample of clock 108; a number of most significant bits of these samples may be omitted. Because it is known that the interval between the arrival of the packet at the interface unit 104 of the source apparatus 10 cannot exceed a predetermined maximum, the most significant bits can be reconstructed in the destination apparatus 12. By omitting the most significant part the transmission capacity required to transmit the samples is reduced.

Furthermore, the information describing the start of the packet is preferably given at least in part as a difference relative to the sample value describing the end of the packet. In this way the capacity required to transmit the samples is reduced. However, a least significant part of the information describing the start of the packet is preferably transmitted as a clock sample, i.e. not differentially relative to the end of the packet. In this way, only the most significant parts of the information describing the start of the packet and the information describing the end of the packet need to be summed in order to compute the instant at which outputting of the data from the packet from the interface unit 124 in the destination apparatus 12 begins; the least significant part need not be summed. This economizes on both computation effort and transmission capacity.

Preferably, the least significant part which is not differentially coded relative to the end of the packet indicates the phase in the periodically repeating pattern of time slots at which the start of the packet is received. The instant at which outputting of the data from the packet the interface unit 124 in the receiving apparatus 12 is initiated is then preferably an integer number of periods of the periodically repeating pattern of time slots after the arrival of the start of the packet at the interface unit 104 in the source apparatus. This instant is detected by comparing the least significant parts of the clock 128 value in the destination apparatus 12 and that of the information describing the start of the packet, and initiating outputting at the instant when the two match in the period which is a predetermined number of periods after reception of the start of the packet at the interface unit 104 of the source apparatus 10.

A preferred example of a format for transmitting information about the sampled clock 108 in the source apparatus 10 to the destination apparatus 12 is the following (12 bits SPHASE, 5 bits CCI, 12 bits EPHASE, 3 bits ECN)

Wherein

SPHASE is the phase of the clock 108 in the source apparatus at the start of arrival of the packet at the interface unit 104 of the source apparatus 10.

EPHASE is the phase of the clock 108 in the source apparatus at the end of arrival of the packet at the interface unit 104 of the source apparatus 10.

CCI is the difference between the period number of arrival of the start and the end of the packet at the interface unit 104 in the source apparatus 10.

ECN is the period number of arrival of the end of the packet at the interface unit 104 in the source apparatus 10.

The source apparatus 10 may be a video recorder, with a record carrier on which time stamps are recorded that reflect the timing of the MPEG signal as it was received when it was recorded. In that case, the source apparatus will contain two clocks: the clock 104 connected to the interface unit 104, and a further clock (not shown) used in connection with the further time stamps recorded on the record carrier to reproduce the original MPEG signal before it is supplied to the interface unit 104.

In this case, in principle, it is also possible to omit the use of the clock 108 connected to the interface unit 104 in the source apparatus, and to send the further time stamps via the bus 14 to the destination apparatus 12, where the proper timing of the MPEG signal is recovered, as described for the video recorder in reproduction mode reproduced. In case the destination apparatus is a recorder in recording mode, it would then not even be necessary to reconstruct the MPEG signal. Instead the MPEG signal and the time-stamps obtained from the source apparatus 10 (which is a video recorder in this case) could be recorded directly on the record carrier in the video recorder in recording mode, without further time-stamping. In this way the sampling to obtain extra time stamps is avoided, and with that additional time jitter is avoided.

However, this would mean that the destination apparatus 12 would have to handle the received signal differently, depending on whether it originated from a video recorder or from another apparatus. To avoid the overhead required for this, it is preferred to use the system of FIG. 4.

Figure 5:
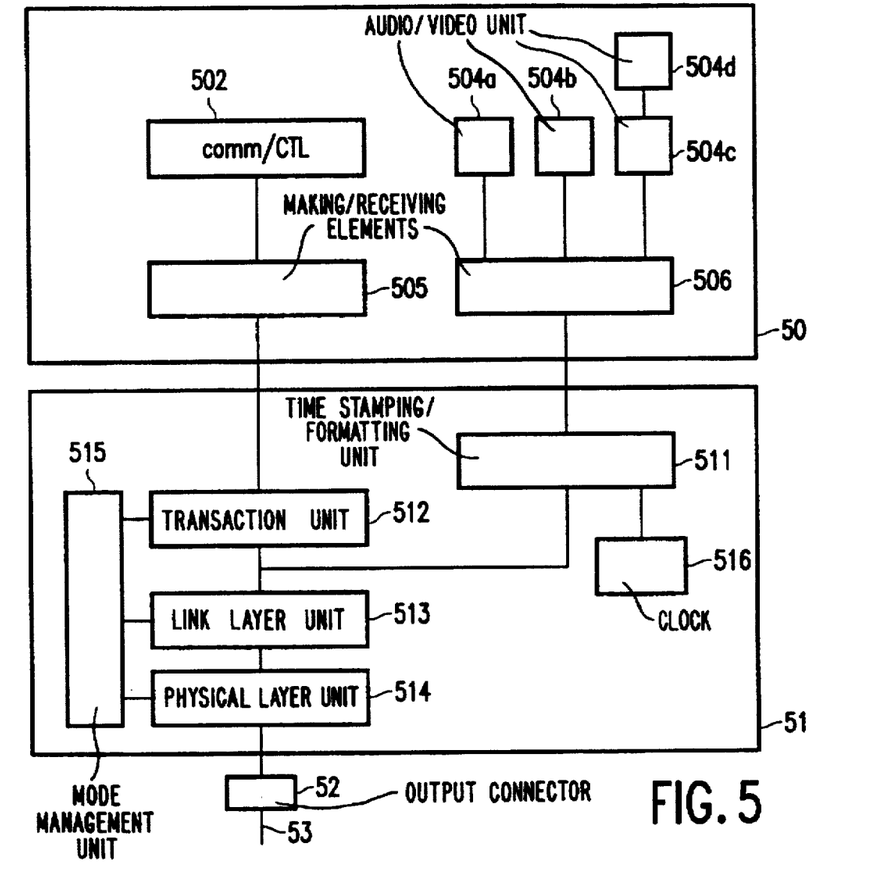
FIG. 5 shows an architecture for a source apparatus for use in the system of FIG. 4.

FIG. 5 shows an architecture for a source apparatus for use in the system of FIG. 4. The Figure shows the functional unit 50 and the interface unit 51, which has an output connector 52 connected to the bus 53.

The functional unit 50 contains a command and control unit 502, and an audio/video unit 504a–d, which are coupled to respective signal unit making/receiving elements 505, 506 (also in the functional unit 50). The signal making/receiving element 506 for the audio video unit 504a–d is coupled to a time stamping/formatting unit 511 in the interface unit 51. The signal making/receiving element 506 for the command and control unit 502 is coupled to a transaction unit 512 in the interface unit 51. The time stamping/formatting unit 511 is connected to a clock 516. The time stamping/formatting unit 511 and the transaction unit 512 are coupled to a link layer unit 513. The link layer unit 513 is coupled to a physical layer unit, which is coupled to the connector 52. A mode management unit 515 is coupled to the transaction unit 512, the link layer unit 513 and the physical layer unit 514.

The bus allows two types of message packets to be transmitted: so-called asynchronous packets and isochronous packets. According to the bus protocol, the apparatus can request that a periodically recurring timeslot is allocated to it. The interface unit 51 then transmits the isochronous packets over the bus in the allocated time-slots. The isochronous packets typically contain audio/video information. The asynchronous packets are also transmitted in time-slots, however these time slots are not periodically recurrent, but have to be acquired one at a time using a bus arbitration protocol. The asynchronous packets typically contain command and control information.

In operation, the audio/video unit 504a–d creates for example an MPEG signal, in combination with header and subcode information signals. In the signal unit making/receiving element 506, these signals are converted into signal units acceptable for the interface unit 51. The signal units are passed to the time stamping/formatting unit 511, which samples the clock 516 upon their arrival, and forms signal packets, containing the signal units received from the functional unit 50 and the sample of the clock 516. These packets are passed to the link layer unit 513, which takes care of addressing the packets, data checking and framing. The packets are passed to the physical layer unit 514, which provides for the electrical interface: detection and transmission of bits, and bus arbitration.

The command and control unit 502, generates signals for commanding and controlling the functioning of one or more other apparatuses that are connected to the bus 53. This information is convened into signal units, and passed to the transaction unit 512 as asynchronous packets. The transaction unit feeds them to the link layer unit 513, for sending in a time-slot which is not occupied by isochronous packets. The packets with command and control information do not receive time stamps; only the isochronous packets receive time stamps.

The operation of the transaction unit 512, the link layer unit 513 and the physical layer unit 515 is controlled an coordinated by the node management unit 515.

Figure 6:
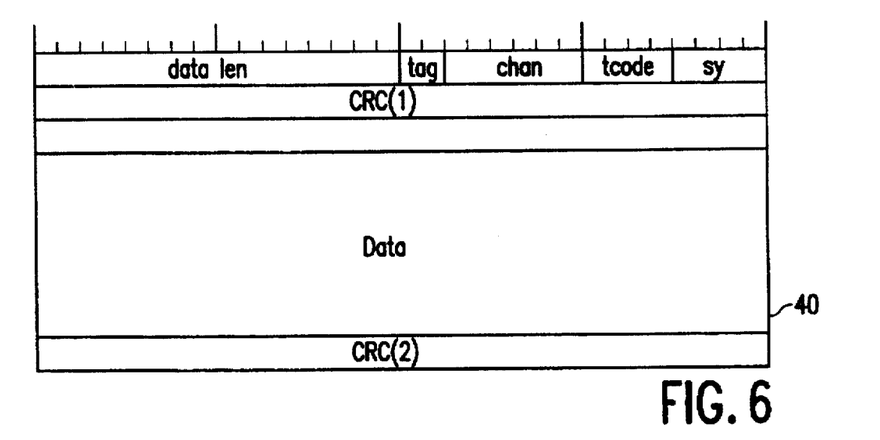
FIG. 6 shows the format of a data packet for transmission by an interface unit.

FIG. 6 shows the format of a data packet for transmission by the interface unit 51. It contains a "data len" field, specifying the length of the data in the packet, a tag field (tag), a channel field (chan), a tcode field (tcode), a sync field (sy), fields (CRC(1), CRC(2)) for CRC codes for error correction, the time stamp, and data.

Figure 7:
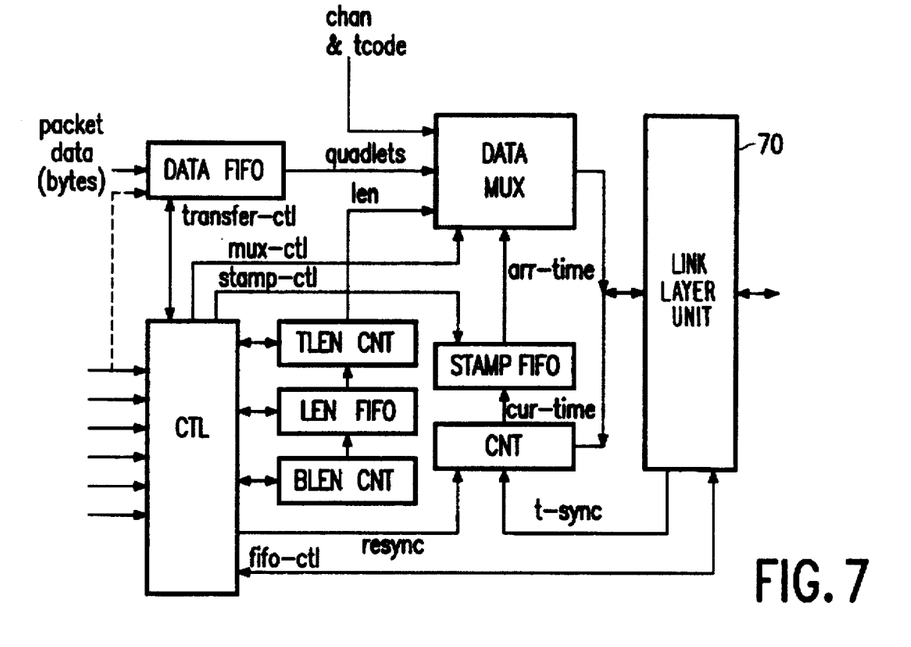
FIG. 7 shows an embodiment of the time stamping/formatting unit in more detail.

FIG. 7 shows an embodiment of the time stamping/formatting unit in more detail. It contains a buffer (data fifo=First In First Out storage), coupled via a data multiplexer (data mux) to the link layer unit 70. The time stamping/formatting unit furthermore contains a control unit (CTL), a counter (CNT) which is coupled to a stamp fifo (STAMP FIFO) and a blength counter (BLEN CNT) which feeds a length fifo (LEN FIFO) which in turn feeds a tlength counter (TLEN CNT). The tlength counter (TLEN CNT) and the stamp fifo have respective outputs coupled to the data multiplexer (data mux). The link layer unit 70 is coupled to the counter (CNT). The control unit (CTL) is coupled to each of the various parts.

In operation, the control unit (CTL) in the interface unit receives from the functional unit several signals, such as a data clock signal, a data valid signal, a start of packet signal, an end of packet signal and a stamp control signal. In response to these signals, the control unit (CTL) controls reading of data (byte by byte) in the data fifo. In response to the stamp control signal, the control unit (CTL) makes the stamp fifo retain a sample of the time value of the counter (CNT). Furthermore the control unit (CTL) controls counting the number of bytes received in the packet, to establish the length of the packet.

When the link layer unit 70 requests that a packet be transmitted to the link layer unit 70, the control unit (CTL) first switches the data multiplexer to pass channel and tcode information and the counted length, subsequently to pass the time stamp sampled in the stamp fifo and then to pass the data from the data fifo (in so-called quadlets of each time four consecutively read bytes).

The counter (CNT) is periodically synchronized to the time of a time master (not shown) by the link layer unit 70, upon a signal from the time master connected to the bus.

Figure 8:
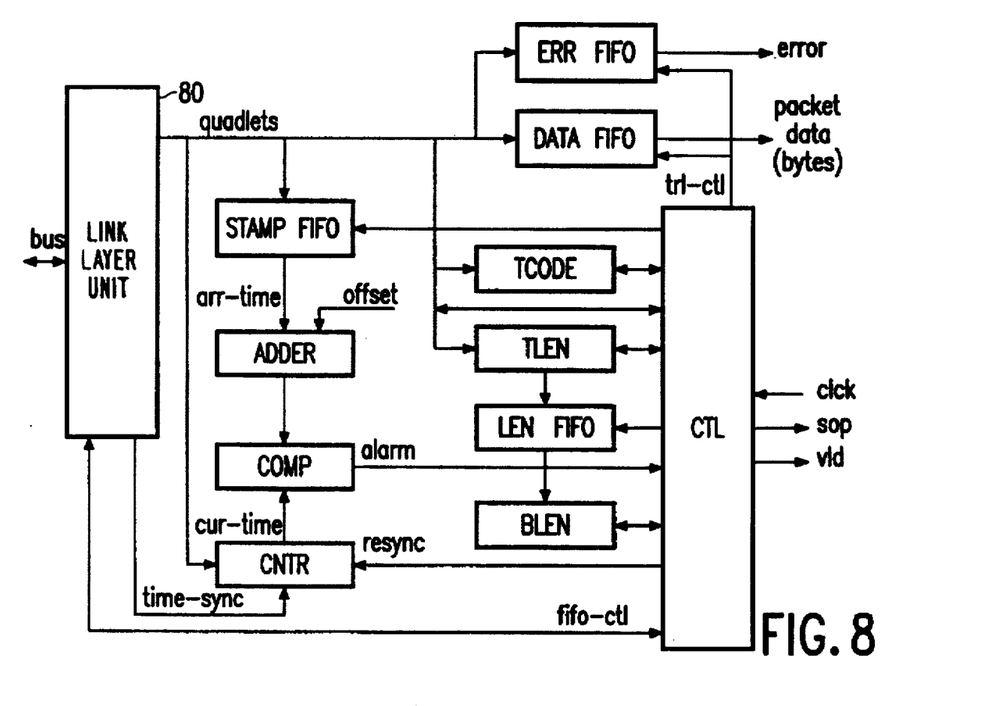
FIG. 8 shows a detailed embodiment of the interface unit in the destination apparatus.

FIG. 8 shows a detailed embodiment of the interface unit in the destination apparatus. It comprises a physical layer/link layer unit 80, coupled to a data fifo, an error fifo, a stamp fifo, a tcode register and a ten register. The data fifo and the error fifo are coupled to the functional unit in the destination apparatus. The interface unit comprises a counter (CNT) coupled to a comparator, the stamp fifo is coupled to the comparator via an adder. The comparator has an alarm output coupled to a control unit (CTL). The Tlen register is coupled to a len fifo which is coupled to a blen register. All components are coupled to the control unit (CTL).

In operation, the link layer unit 80 passes the data received from the transmitting interface unit via the bus. Under control of the control unit, this information is dispersed over the various registers and FIFOs. The time stamp is entered into the stamp fifo. From there it is output to the adder in which a predetermined offset is added to the time stamp. The offset represents the maximum delay that a signal can incur between arriving at the interface unit of the source apparatus and arriving at the interface unit in the destination apparatus. The sum of the time stamp and the offset is fed to the comparator (COMP), which supplies an alarm signal to the control unit CTL when the counter (CNT) reaches the said sum. In response thereto the control unit makes the data FIFO supply data received from the link layer unit 80 to the functional unit, and issues a start of packet signal and identifies the data as valid. The data is clocked out of the data FIFO under control of a data-clock supplied by the functional unit.

We claim:

1. A signal processing system comprising a source apparatus coupled to a destination apparatus, the source apparatus being arranged for supplying a signal to the destination apparatus, the signal comprising video data and a time-stamp, the destination apparatus comprising a clock and means for detecting when a time-value of the clock corresponds to the time-stamp and for thereupon presenting the video data at an output, the signal further comprising synchronization data representing a time-value associated with an instant of delivery of the signal in the destination apparatus, the destination apparatus being arranged for adjusting the time-value of the clock according to the synchronization data, the system being characterized in that said system comprises a bus operable according to a time-slot allocation protocol, the source apparatus comprising a first interface unit for buffering the signal until an allocated time-slot is available on the bus, the synchronization data being set according to an instant of delivery of the signal to the first interface unit, the source apparatus supplying the signal to the destination apparatus via the bus, the destination apparatus comprising a buffer for buffering the signal prior to adjusting the time-value of the clock, the buffering in the buffer lasting until a predetermined interval, at least equal to a maximum wait-interval for the allocation of a time-slot on the bus, has elapsed after the instant of delivery of the signal to the first interface unit.

2. A signal processing system according to claim 1, wherein the source apparatus and the destination apparatus comprise a first further clock and a second further clock respectively, means for synchronizing the first and second further clock to each other by further signals via the bus, the source apparatus being arranged for obtaining a sample value from the first further clock at the instant of delivery to the first interface unit, and transmitting information about that sample value to the destination apparatus, the buffer buffering the signal until the second further clock exceeds the sample value by a predetermined offset representing the predetermined interval.

3. A signal processing system according to claim 2, wherein the signal comprises packets, mutually separated by pauses, the sample value being obtained upon delivery of a first part of a packet to the first interface unit, the source apparatus being arranged for obtaining a further sample value from the first further clock upon delivery of a second part of said packet to the first interface unit, the buffer regulating a speed at which the signal is output such that the number clock cycles between outputting the first and the second part of the packet is substantially equal to the difference between the sample value and the further sample value.

4. A signal processing system according to claim 3, wherein the first part precedes the second part in the packet, the first interface unit being arranged for transmitting information about at least a most significant part of the sample value as a difference relative to the further sample value.

5. A signal processing system according to claim 4, wherein the first interface unit is arranged for transmitting a least significant part of the sample value.

6. A signal processing system according to claim 5, wherein said least significant part of the sample value represents a phase in a period a pattern of periodically allocated time-slots on the bus.

7. A signal processing system according to claim 1, wherein the source apparatus is arranged for reproducing the signal from a record carrier, on which it is stored together with a further time-stamp for regenerating the timing of the signal for supplying it to the destination apparatus, the timing of the signal being regenerated according to the time-stamp prior to supplying it to the first interface unit.

8. A signal processing system according to claim 1, wherein the signal supplied to the destination apparatus is an MPEG based signal.

9. A signal processing system according to claim 3, wherein the source apparatus is arranged for reproducing the signal from a record carrier, on which it is stored together with a further time-stamp for regenerating the timing of the signal for supplying it to the destination apparatus, the timing of the signal being regenerated according to the time-stamp prior to supplying it to the first interface unit.

10. A signal processing system according to claim 6, wherein the source apparatus is arranged for reproducing the signal from a record carrier, on which it is stored together with a further time-stamp for regenerating the timing of the signal for supplying it to the destination apparatus, the timing of the signal being regenerated according to the time-stamp prior to supplying it to the first interface unit.

11. A signal processing system according to claim 3, wherein the signal supplied to the destination apparatus is an MPEG based signal.

12. A signal processing system according to claim 7, wherein the signal supplied to the destination apparatus is an MPEG based signal.

* * * * *